(12) United States Patent
Wang

(10) Patent No.: US 10,840,843 B2
(45) Date of Patent: Nov. 17, 2020

(54) METHOD OF STARTING SENSORLESS BLDC MOTOR

(71) Applicant: ZHONGSHAN BROAD-OCEAN MOTOR CO., LTD., Zhongshan (CN)

(72) Inventor: Jizhong Wang, Zhongshan (CN)

(73) Assignee: ZHONGSHAN BROAD-OCEAN MOTOR CO., LTD., Zhongshan (CN)

(*) Notice: Subject to any disclaimer, the term of this patent is extended or adjusted under 35 U.S.C. 154(b) by 140 days.

(21) Appl. No.: 16/254,543

(22) Filed: Jan. 22, 2019

(65) Prior Publication Data

US 2019/0173407 A1 Jun. 6, 2019

Related U.S. Application Data

(63) Continuation-in-part of application No. PCT/CN2017/099662, filed on Aug. 30, 2017.

(30) Foreign Application Priority Data

Jun. 13, 2017 (CN) .......................... 2017 1 0444429

(51) Int. Cl.
*H02P 21/34* (2016.01)
*H02P 6/21* (2016.01)
(Continued)

(52) U.S. Cl.
CPC ................ *H02P 21/34* (2016.02); *H02P 6/18* (2013.01); *H02P 6/20* (2013.01); *H02P 6/21* (2016.02); *H02P 21/24* (2016.02); *H02P 21/30* (2016.02)

(58) Field of Classification Search
CPC .. H02P 21/34; H02P 6/21; H02P 21/24; H02P 21/30; H02P 6/18; H02P 6/20
(Continued)

(56) References Cited

U.S. PATENT DOCUMENTS

| 5,905,348 A | 5/1999 | Nolan |
| 6,035,626 A * | 3/2000 | Wahl ........................ F02C 7/275 |
| | | 290/40 A |

(Continued)

FOREIGN PATENT DOCUMENTS

| CN | 101478281 A | 7/2009 |
| CN | 101729013 A | 6/2010 |
| CN | 102638216 A | 8/2012 |

*Primary Examiner* — Jorge L Carrasquillo
(74) *Attorney, Agent, or Firm* — Matthias Scholl P.C.; Matthias Scholl

(57) ABSTRACT

A method of starting a sensorless BLDC motor. The method includes: providing a stator flux rotating coordinate system including a ds-axis and a qs-axis, selecting a voltage Vds on the ds-axis, allowing a voltage Vqs on the qs-axis to be 0, and resetting a to-be-started motor to a preset position; providing a flux λ to the motor, allowing the current Iqs on the qs-axis to rise, maintaining the flux constant, calculating a real-time torque T1 according to the torque/current closed loop on the qs-axis, comparing a preset starting torque T0 with the real-time torque T1, performing the torque/current closed-loop control until the real-time torque T1 reaches the preset starting torque T0; and continuously raising the real-time torque according to the torque/current closed loop to operate a load, measuring a real-time rotation speed V1, comparing a preset starting rotation speed V0 with the measured real-time rotation speed V1.

8 Claims, 15 Drawing Sheets

(51) Int. Cl.
*H02P 21/24* (2016.01)
*H02P 21/30* (2016.01)
*H02P 6/18* (2016.01)
*H02P 6/20* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 6,069,467 | A * | 5/2000 | Jansen | H02P 6/183 |
| | | | | 318/801 |
| 9,369,073 | B1 * | 6/2016 | Tian | H02P 6/21 |
| 2010/0109583 | A1 * | 5/2010 | Maekawa | H02P 21/0003 |
| | | | | 318/400.02 |
| 2013/0049363 | A1 * | 2/2013 | Smith | H02P 21/22 |
| | | | | 290/44 |
| 2013/0257324 | A1 * | 10/2013 | Maekawa | H02P 21/14 |
| | | | | 318/400.02 |

* cited by examiner

METHOD OF STARTING SENSORLESS BLDC MOTOR

CROSS TO RELATED APPLICATIONS

This application is a continuation-in-part of International Patent Application No. PCT/CN2017/099662 with an international filing date of Aug. 30, 2017, designating the United States, now pending, and further claims foreign priority benefits to Chinese Patent Application No. 201710444429.3 filed Jun. 13, 2017. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

Conventionally, the sensorless electric motors exhibit poor adaptability to various loads due to lack of feedback signals in the startup stage. To solve the problem, a common method is to provide maximum possible starting current in the startup stage to produce maximum starting torque. This leads to excessive energy consumption, noise, and shortened service life of the electronic devices.

SUMMARY

Disclosed is a method of starting a sensorless BLDC motor that is energy-saving and produces no noise in the working state.

The disclosure provides a method of starting a sensorless BLDC motor, the method comprising:

1) providing a stator flux rotating coordinate system comprising a ds-axis and a qs-axis, selecting a voltage Vds on the ds-axis, allowing a voltage Vqs on the qs-axis to be 0, and resetting a to-be-started motor to a preset position;
2) providing a flux λ to the motor, allowing the current Iqs on the qs-axis to rise, maintaining the flux constant according to the voltage/flux closed loop on the ds-axis, calculating a real-time torque T1 according to the torque/current closed loop on the qs-axis, comparing a preset starting torque T0 with the real-time torque T1, performing the torque/current closed-loop control until the real-time torque T1 reaches the preset starting torque T0; and
3) continuously raising the real-time torque according to the torque/current closed loop to operate a load, measuring a real-time rotation speed V1, comparing a preset starting rotation speed V0 with the measured real-time rotation speed V1, and performing the torque/current closed-loop control until the measured rotation speed V1 reaches the preset starting rotation speed V0.

In 2), the flux λ input to the motor can range from 60% to 100% of the saturated flux.

In 2), the flux λ input to the motor can be a saturated flux.

The starting torque T0 can be a critical torque; when the real-time torque T1 is greater than the starting torque T0, the motor rotates.

The load driven by the motor can be a fixed load, and the starting torque T0 can be a preset value acquired by experimental measurement, and adapts to start the fixed load.

The load driven by the motor can be a variable load, and the starting torque T0 can be a preset value acquired by experimental measurement, and adapts to start the minimum load.

In 3), the motor can be controlled by a closed-loop proportion-integration-differentiation (PID) controller, and the torque can be raised by ΔT at intervals until the measured rotation speed V1 reaches the preset starting rotation speed V0.

Advantages of the method of starting a sensorless BLDC motor according to embodiments of the disclosure are summarized as follows.

1) The starting torque T0 accurately matches the initial load, and the entire startup process is controlled by the closed loop signals, so that the startup is smooth, stable, and energy-saving.
2) The starting current is relatively low, imposing less impact on the electronic components, and the noise is small.
3) The method is efficient in providing an optimal torque to the motor.
4) The method is easy to operate and highly adaptable to various fixed loads or variable loads.

DETAILED DESCRIPTION

To further illustrate, embodiments detailing a method of starting a sensorless BLDC motor are described below. It should be noted that the following embodiments are intended to describe and not to limit the disclosure.

EXAMPLE 1

Figure 1:
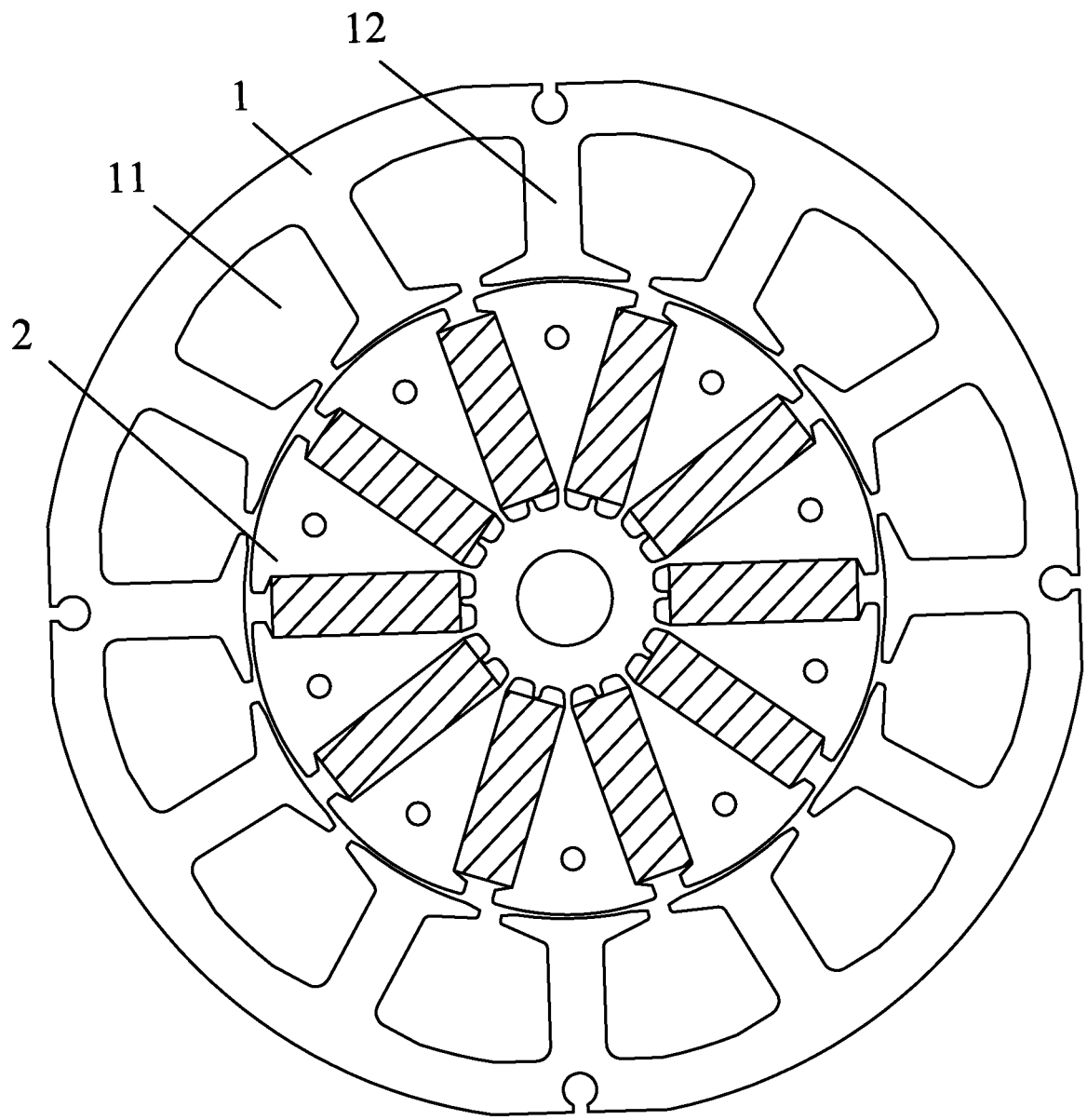
FIG. 1 is a schematic diagram of a sensorless BLDC motor as described in the disclosure.
Figure 2:
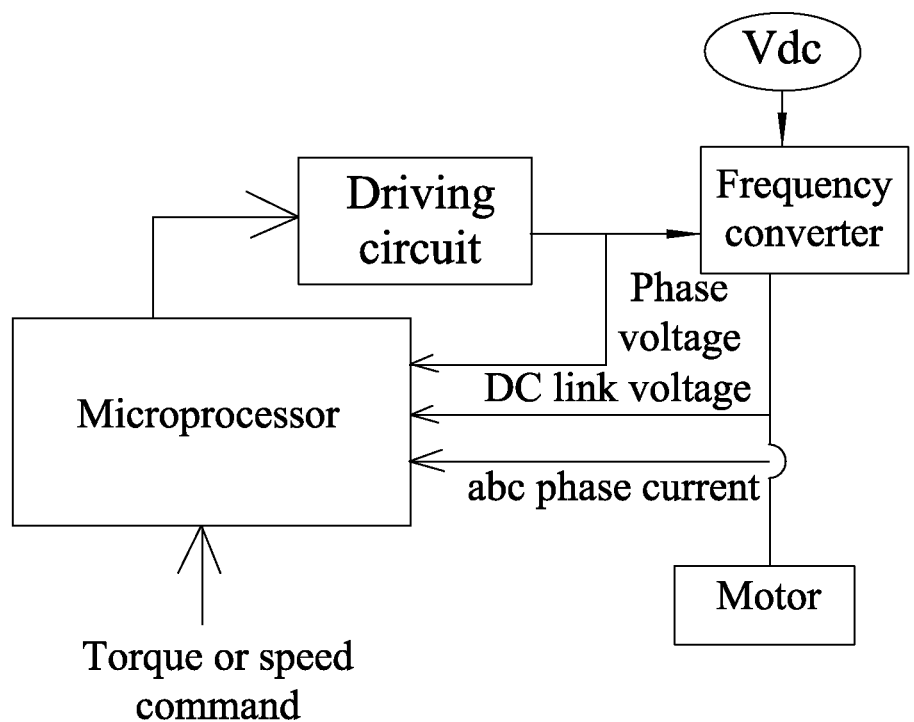
FIG. 2 is a circuit block diagram of a motor controller of a sensorless BLDC motor as described in the disclosure.
Figure 3:
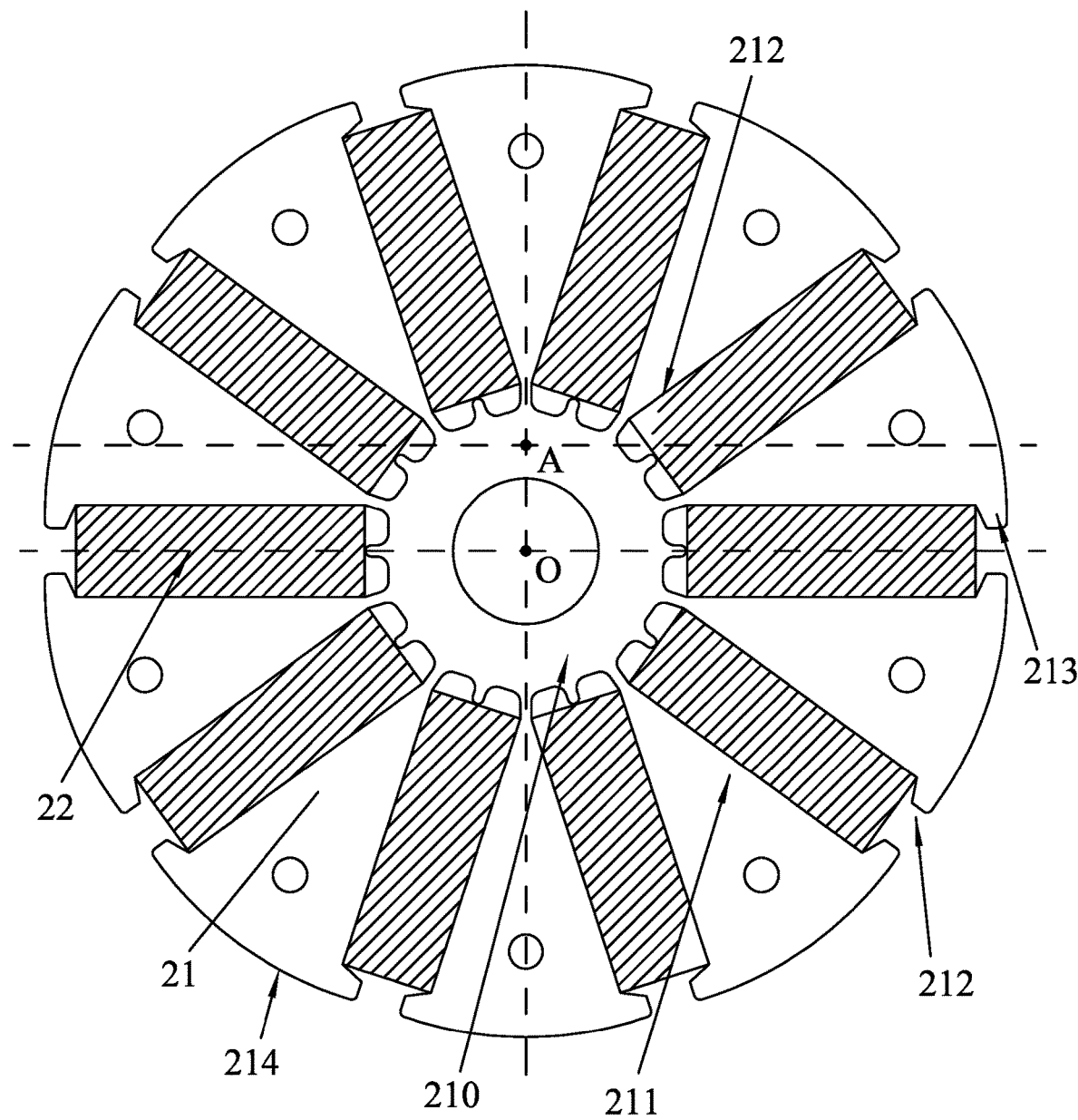
FIG. 3 is a structural diagram of a salient-pole inner rotor of a sensorless BLDC motor as described in the disclosure.

As shown in FIGS. 1, 2 and 3, a sensorless BLDC motor comprises a stator assembly, a rotor assembly 2 and a motor controller. The stator assembly comprises a stator core 1 and a coil winding. Teeth 12 and a groove 11 are formed on the stator core 1, and the coil winding is wound on the teeth 12. The rotor assembly is a salient-pole inner rotor. The motor controller performs sensorless vector control. The motor controller comprises a microprocessor, a frequency converter and a detection unit. The detection unit inputs a phase current, a DC bus current and a phase voltage into the microprocessor, and the microprocessor outputs a signal for controlling the frequency converter. The frequency converter is connected to the winding of the stator assembly. The saliency Lq/Ld of the salient-pole rotor ranges from 1.3 to 1.7, and the gap flux density on the surface of the salient-pole rotor ranges from 0.6 Tesla to 0.8 Tesla. The processor outputs a signal for controlling the frequency converter through a driving circuit, and the frequency converter is connected to the winding of the stator assembly.

The salient-pole inner rotor 2 comprises a rotor core 21 and a permanent magnet 22. The rotor core 21 comprises an annular ring 210 having a central shaft hole and a plurality of magnetic conducting blocks 211 protruding from the outer side of the annular ring 210. A radial groove 121 for mounting the permanent magnet is formed between two adjacent magnetic conducting blocks 211, and stop hooks 213 protrude from the magnetic conducting blocks 211 on two sides of an opening portion of the radial groove 212. The outer side face 214 of each of the magnetic conducting blocks 211 has an arc-shaped cross-section, and the outer side face 214 is centered at the point A that is offset a certain distance H from the center o of the central shaft hole. A gap (referred to as an air gap L1) is radially formed between the inner wall of the stator and the outer edge of the rotor core. The permanent magnet 22 may also be referred to as magnetic steel whose thickness is denoted by H; and the ratio of the air gap L1 to the thickness H of the magnetic steel is 0.03 to 0.065. The saliency Lq/Ld of the salient-pole rotor may range from 1.3 to 1.7, and the ratio of the pole arc length L2 of the rotor core 21 to the length L3 of the magnetic steel is 0.8 to 1.0. The magnetism gathering effect is realized through the core by means of surfaces of two permanent magnets having the same polarity, so that the gap flux density on the surface of the salient-pole rotor may range from 0.6 Tesla to 0.8 Tesla. By improving the torque density of the motor and by improving the flux density by the salient pole structure, the cost of the motor is reduced. For the magnetic steel, the original neodymium iron boron may be replaced with ferrite, further reducing the cost. The number of magnetic poles of the rotor is 8, 10 or 12.

Figure 4:
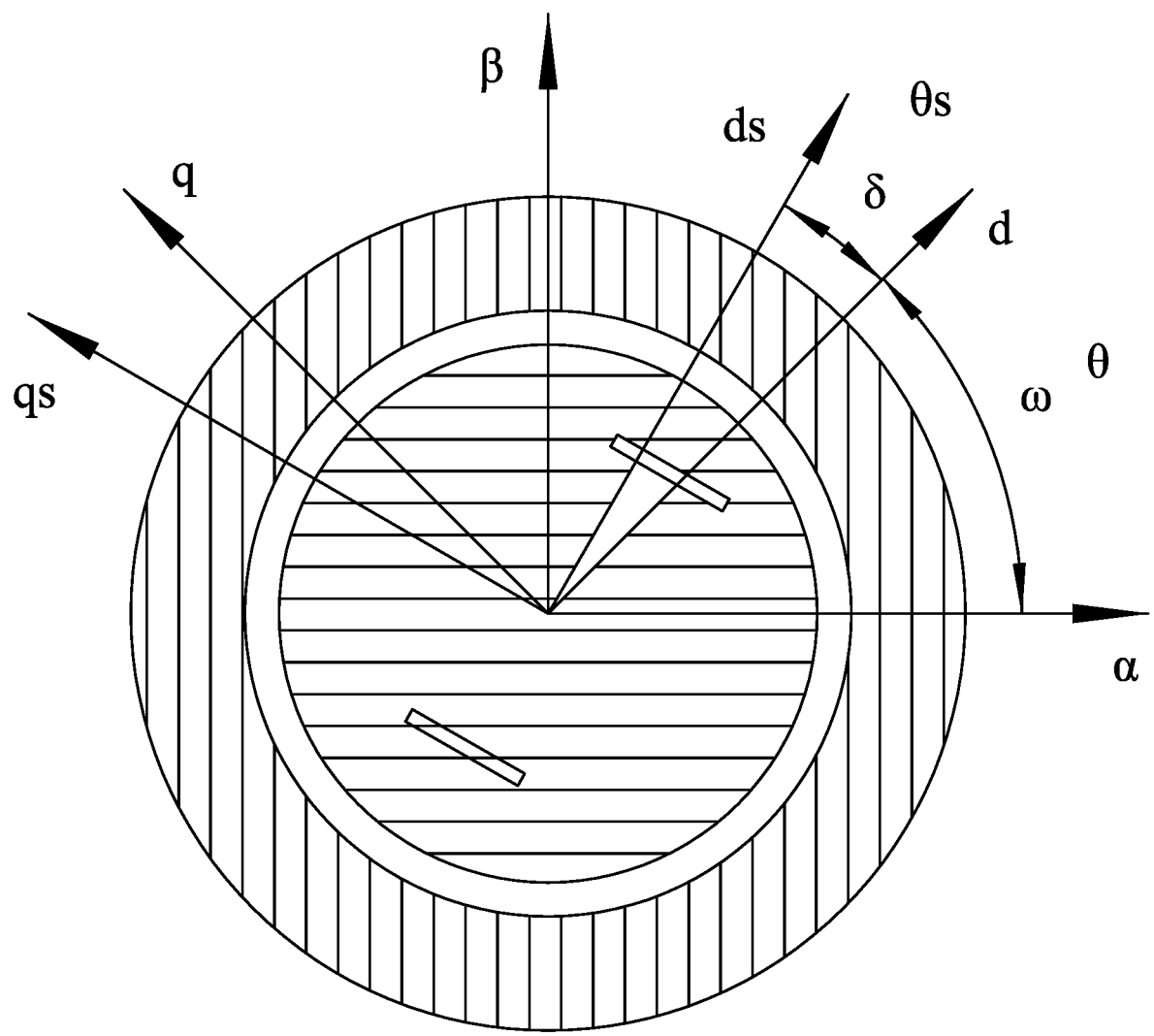
FIG. 4 is a diagram of a coordinate system of direct stator flux vector control as described in the disclosure.

FIG. 4 defines reference coordinates of vectors of permanent magnet synchronous motor, a stationary coordinate system α-β, a rotor rotating coordinate system d-q and a stator flux rotating coordinate system ds-qs, where ω is the rotor speed, δ is a load angle (i.e., an included angle between the stator flux rotating coordinate system and the rotor rotating coordinate system), the angle ϑ is an included angle between the stationary coordinate system α-β and the rotor rotating coordinate system d-q, λ is a stator flux vector, and the angle ϑs is an included angle between the stationary coordinate system α-β and the stator flux rotating coordinate system ds-qs.

In the stationary coordinates α, β, the relation between the voltage and the torque of the internal permanent magnet motor is expressed by:

$$\bar{v}_{\alpha\beta} = R_s \cdot \bar{i}_{\alpha\beta} + \frac{d\bar{\lambda}_{\alpha\beta}}{dt} \tag{1}$$

$$T_e = \frac{3}{2} \cdot p \cdot (\lambda_\alpha \cdot i_\beta - \lambda_\beta \cdot i_\alpha) \tag{2}$$

where Rs is the stator resistance and p is the number of magnetic pole pairs.

The control for the motor is converted into electromagnetic flux control by a flux-coupled current. The flux of the internal permanent magnet motor is generally expressed by the following mathematic formula in the rotor coordinates d, q:

$$\bar{\lambda}_{dq} = [L] \cdot \begin{bmatrix} i_d \\ i_q \end{bmatrix} + \begin{bmatrix} \lambda_m \\ 0 \end{bmatrix} = \begin{bmatrix} \lambda_d(i_d, i_q) \\ \lambda_q(i_d, i_q) \end{bmatrix} \tag{3}$$

where $\lambda_m$ is a flux linkage.

In the unsaturated flux state, the above formula may be simplified into:

$$\bar{\lambda}_{dq} = \begin{bmatrix} L_d & 0 \\ 0 & L_q \end{bmatrix} \cdot \begin{bmatrix} i_d \\ i_q \end{bmatrix} + \begin{bmatrix} \lambda_m \\ 0 \end{bmatrix} \tag{4}$$

where Ld is the inductance of the motor on the d-axis and Lq is the inductance of the motor on the q-axis.

If the position of the rotor is ϑ and the magnetic domain is in the stationary coordinates α, β, the formula is expressed by:

$$\bar{\lambda}_{\alpha\beta} = A(-\vartheta) \cdot \bar{\lambda}_{dq} = A(-\vartheta) \cdot \left\{ \begin{bmatrix} L_d & 0 \\ 0 & L_q \end{bmatrix} \cdot A(\vartheta) \cdot \begin{bmatrix} i_\alpha \\ i_\beta \end{bmatrix} + \begin{bmatrix} \lambda_m \\ 0 \end{bmatrix} \right\} \tag{5}$$

$$A(\vartheta) = \begin{bmatrix} \cos(\vartheta) & \sin(\vartheta) \\ -\sin(\vartheta) & \cos(\vartheta) \end{bmatrix}.$$

In the stator flux coordinates ds, qs, the relation between the voltage model and the torque is expressed by:

$$\bar{v}_{dqs} = R_s \cdot \bar{i}_{dqs} + \frac{d}{dt}\begin{bmatrix} \lambda \\ 0 \end{bmatrix} + \lambda \cdot \begin{bmatrix} 0 \\ \omega + \frac{d\delta}{dt} \end{bmatrix} \tag{6}$$

$$T_e = (3/2) \cdot p \cdot \lambda \cdot i_{qs} = k_T \cdot i_{qs} \tag{7}$$

where ω is a rotor speed and δ is a load angle.

It is known from the formula (6) that the stator flux vector λ and the voltage on the ds-axis are directly corrected, and the load angle and the torque can be controlled by the voltage on the qs-axis; and, in the formula (7), the torque is directly controlled by controlling the current Iqs on the qs-axis. Vqs is related to Iqs: Vqs=Iqs*Rs+Ls*dIqs/dt, where Rs is the stator resistance so that the current Iqs on the qs-axis may be controlled by controlling the voltage Vqs on the qs-axis.

It is found from the formula (6) that the stator flux vector value λ may be directly adjusted by the voltage Vds on the ds-axis and the load angle (and thus the torque) may be controlled by the voltage Vqs on the qs-axis. However, the formula (7) indicates that the torque may be straightforwardly adjusted by adjusting the current Iqs on the qs-axis. Therefore, for the voltage model in the coordinate system (ds, qs), the load angle used in the formula (7) is replaced with the current Iqs on the qs-axis as a state variable.

As proved in formula (6), the voltage model in the framework (ds, qs) is converted into:

$$\frac{d\lambda}{dt} = -R_s \cdot i_{ds} + v_{ds} \quad (8)$$

Figure 5:
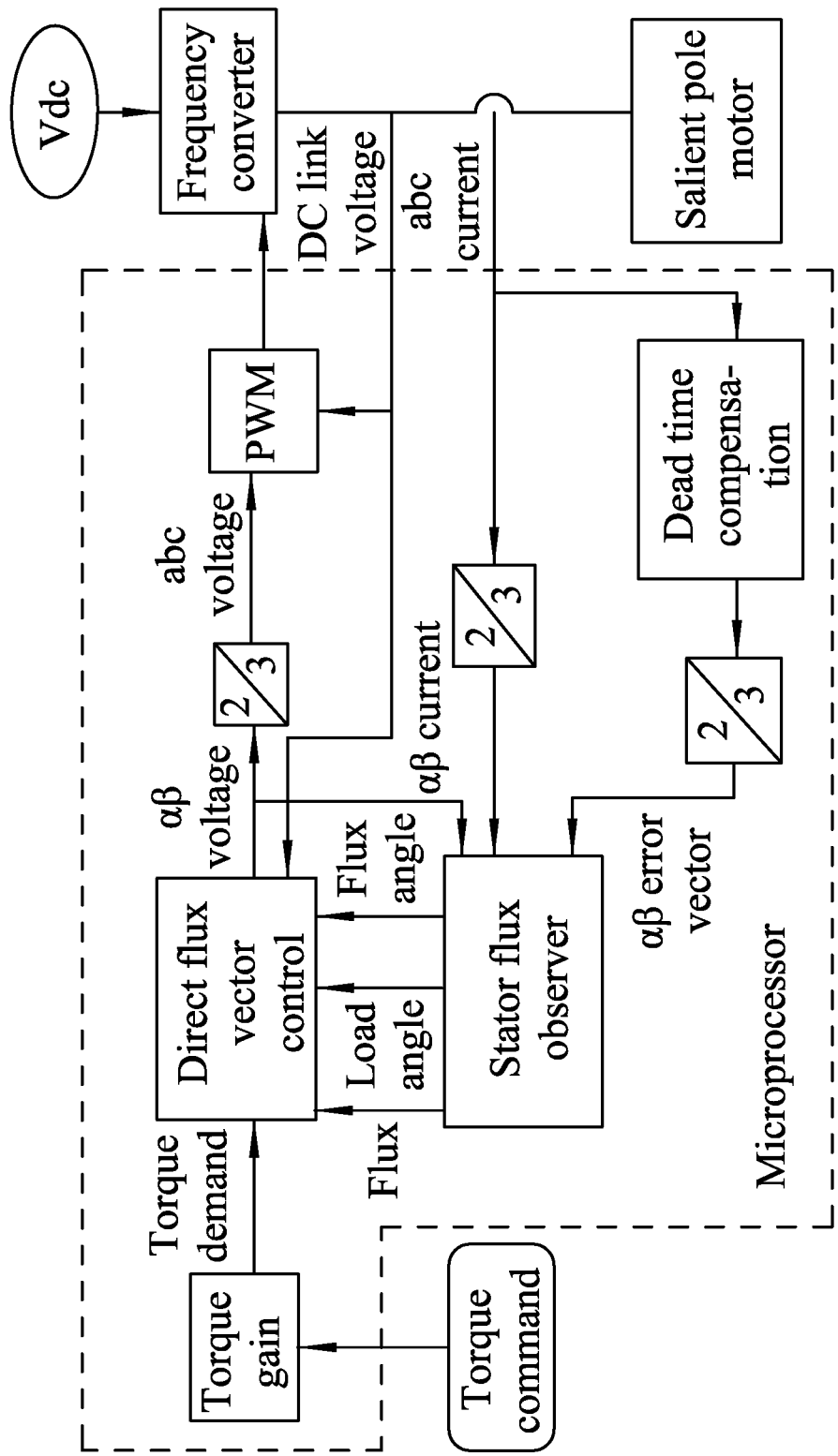
FIG. 5 is a block diagram of direct stator flux vector control for a torque input as described in the disclosure.

FIG. 5 is a module diagram of direct stator flux vector control for a torque input. The module comprises a direct flux vector control (DFVC), a stator flux observer and a dead time compensation module. A torque instruction is introduced via a torque gain, as the desired torque reference for readjustment.

Figure 6:
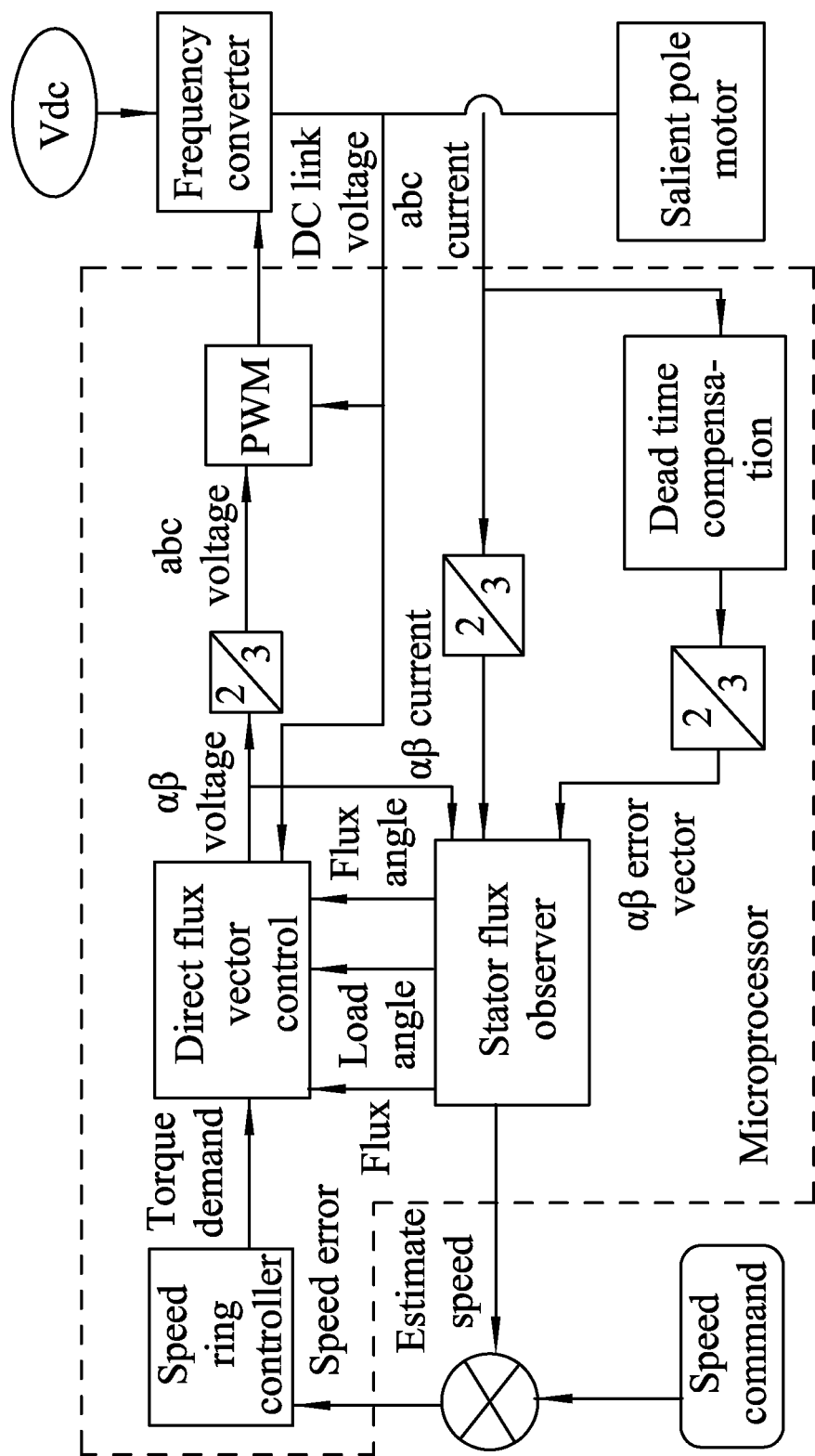
FIG. 6 is a block diagram of direct stator flux vector control for a speed input as described in the disclosure.

FIG. 6 shows a module diagram of a combination of flux controls in the speed control model, comprising a direct flux vector control (DFVC), a stator flux observer and a dead time compensation module. A speed instruction is used as a reference for a Proportional Integral (PI) controller, and a speed ring controller generates a torque instruction.

Figure 7:
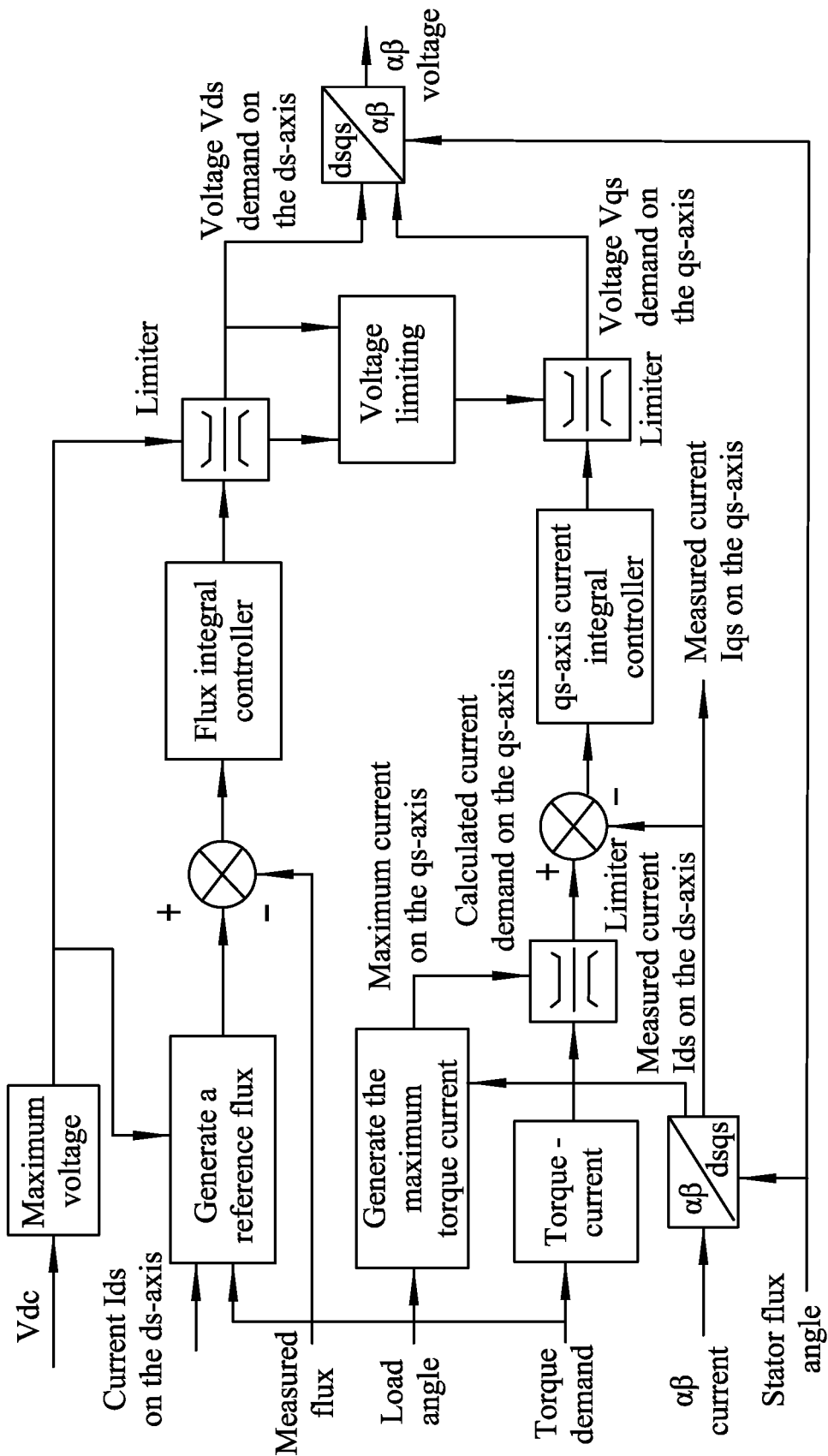
FIG. 7 is an expanded view of blocks of the direct flux vector control of FIG. 5.

FIG. 7 is a module diagram of the DFVC scheme. This scheme is implemented in a stator flux reference framework. The feedback information and the output quantities sensed from the flux observer are transmitted to this DFVC control, and the torque instruction is used as a control reference variable. In this scheme, there are two control loops, i.e., a stator flux loop and a q-axis current loop. The PI controller is used for the two control loops. This DFVC scheme has the advantage that the voltage at the frequency converter, the current restriction and the load angle restriction are taken into consideration during the adjustment of the flux and current.

There are two loop PID controls in the scheme of FIG. 7. The first PID control is a torque-current loop control PID (a torque controller), and the second PID control is a voltage-flux loop control PID (a flux controller). The torque-current loop control PID is realized by calculating the magnitude of Iqs according to the input torque demand T by the formula (7), then comparing the Iqs with the measured current on the qs-axis and using a current integral controller on the qs-axis, so as to control the voltage Vqs on the qs-axis. The second PID control is a voltage-flux loop control PID, where the optimal control flux λ (i.e., the reference flux) is obtained according to the input torque demand T and the measured current on the ds-axis by a MTPA control mode look-up method, the voltage Vds on the ds-axis is obtained by comparing the reference flux λ with the measured flux and by a flux integral controller and the formula (8); and, the voltage Vα,Vβ under the stationary coordinates is obtained from the voltage Vqs on the qs-axis and the voltage Vds on the ds-axis by a coordinate transformation method, and the voltage Vα,Vβ under the stationary coordinates is converted into three voltages Va, Vb and Vc.

Figure 8:
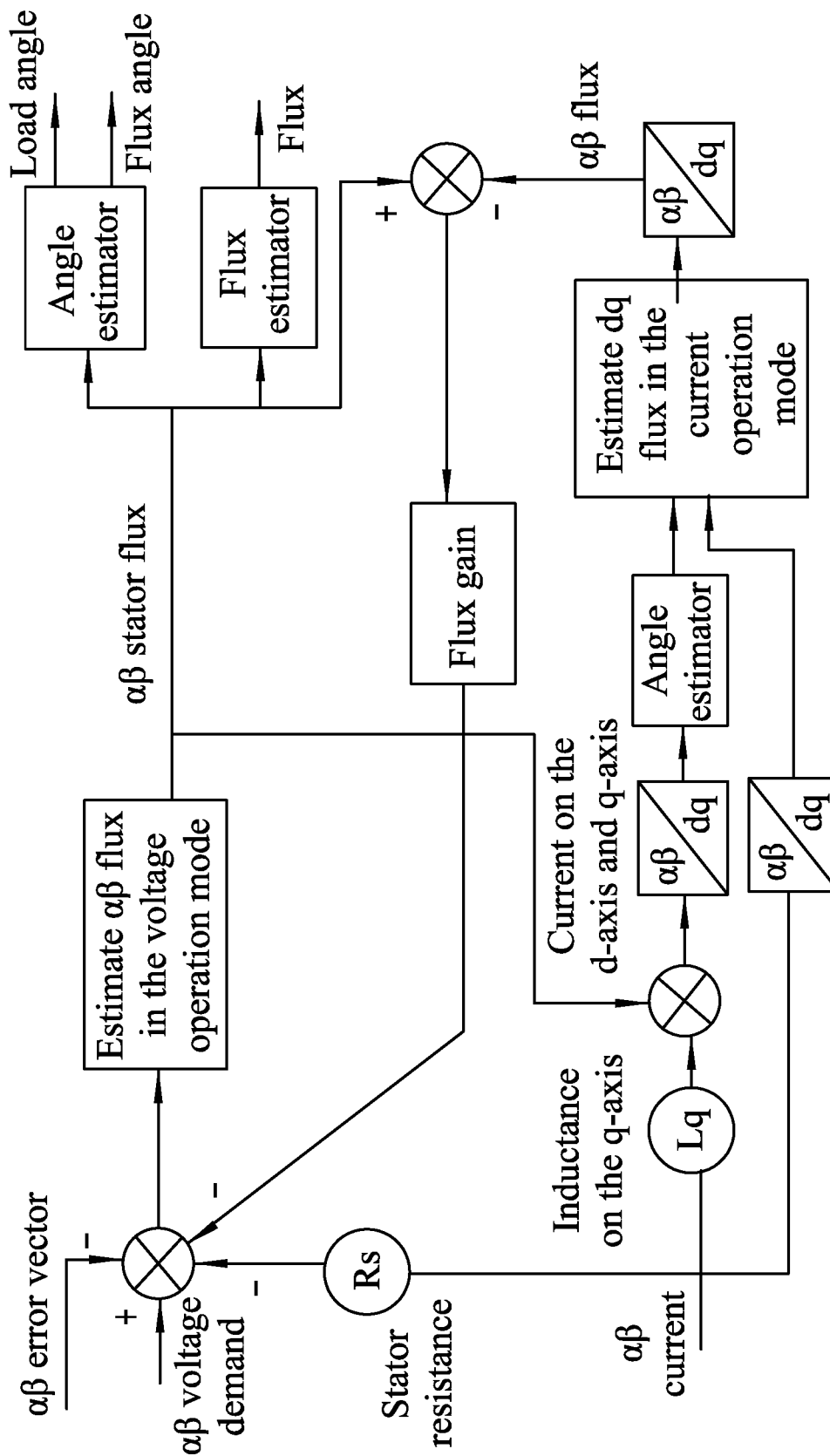
FIG. 8 is an expanded view of a stator flux observer of FIG. 5.

FIG. 8 is a module diagram of the stator flux observer. As a key entity, the observer provides the stator flux value, the stator flux position and the load angle. The output quantities from this stator flux observer are input quantities of the DC flux vector control (DFVC). Naturally, the stator flux observer is a hybrid of two different models, and performs, based on whether the frequency converter is saturated, proper processing in two different situations. At a low speed, the stator flux observer operates in a current mode in which the control is realized by controlling only the current according to the input torque, that is, it is the torque current control module mentioned above. On the other hand, at a high speed, the stator flux observer operates in a voltage mode in which only the voltage is controlled, that is, it is the direct stator flux vector control model mentioned above. The crossed angular frequency is switched between the low speed mode and the high speed mode, and may be defined by the gain of the observer (rad/s).

Figure 9:
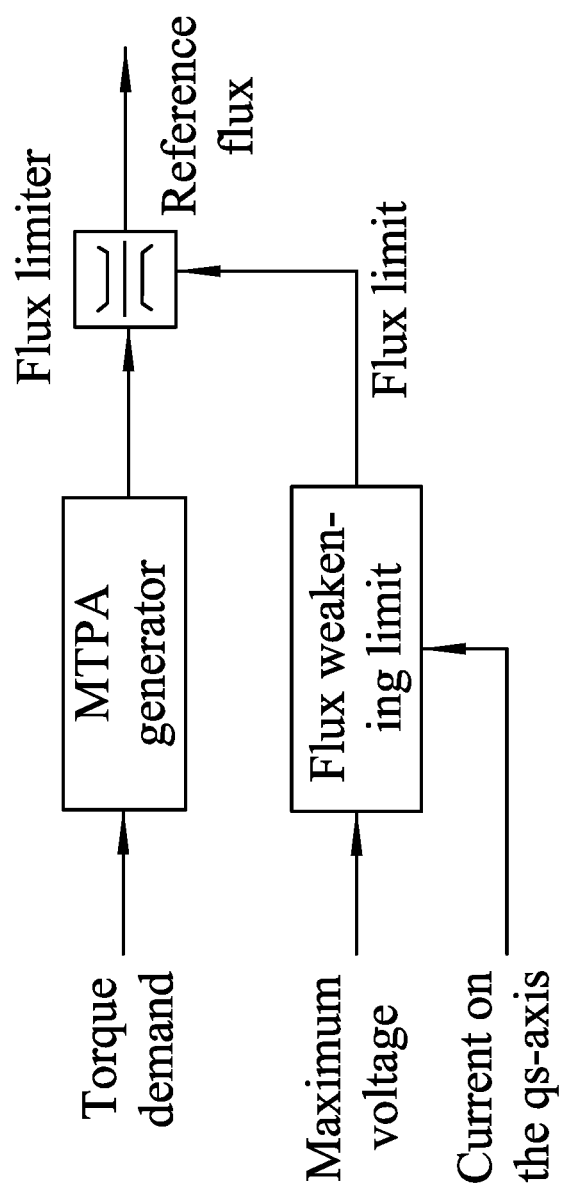
FIG. 9 is a flowchart of generation of a reference flux of the direct stator flux vector control as described in the disclosure.
Figure 10:
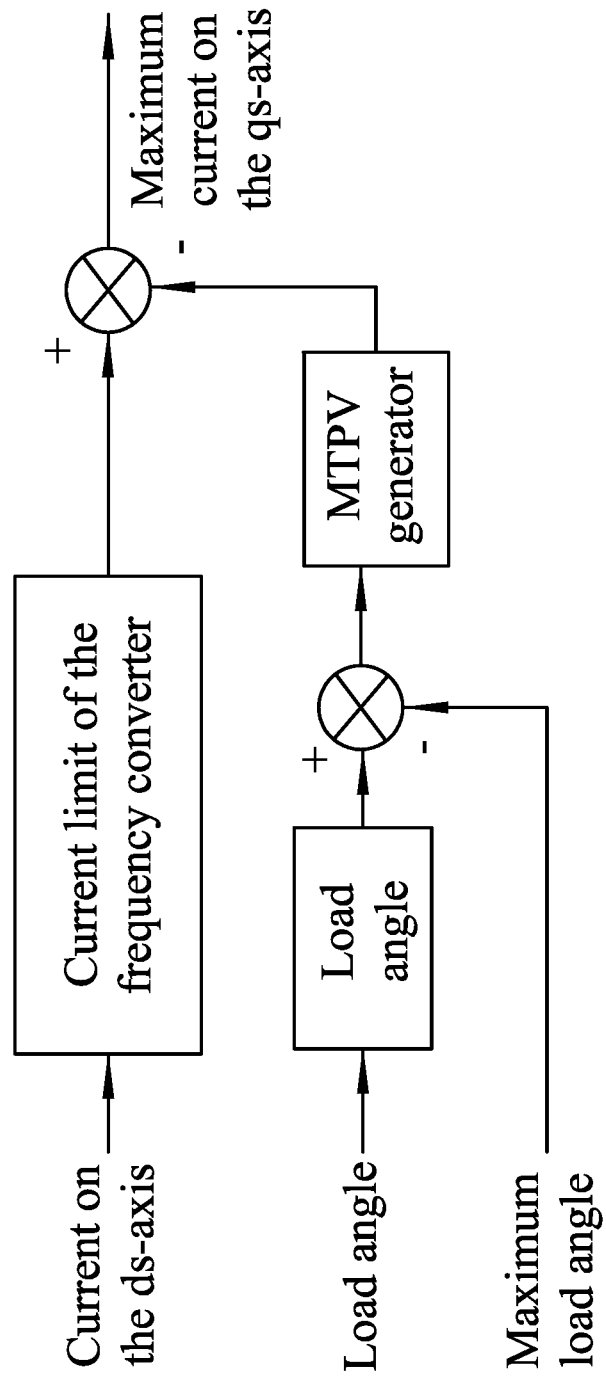
FIG. 10 is a flowchart of generation of a maximum qs-axis current in the direct stator flux vector control as described in the disclosure.

FIG. 9 is a module diagram of the generation of the flux reference, where the low-speed MTPA control and the weak flux control of raising the torque are illustrated. A reference flux generation module provides a reference flux based on the saturation or speed range of the frequency converter. As shown in FIG. 6, at the basic rotation speed, the reference flux is provided in the following optional control mode, and thus named a maximum torque per ampere (MTPA) mode. The instruction torque is used as an input during the generation of this MTPA. For most internal permanent magnet motors, this MTPA mode is a non-linear curve. This curve may be obtained by characteristic tests or simulated by finite element analysis. Subsequently, the table lookup method is carrier out. When the rotation speed increases, the counter electromotive force of the motor increased, and the frequency converter begins to be saturated, which makes the voltage limiting condition valid and the MTPA condition invalid. The maximum voltage depends on the pulse width modulation (PWM) and the instant DC link voltage. The voltage limiting operation is realized by limiting the stator flux reference value. This reference value is from a weak flux control module. In this way, the switchover between the weak flux control and the MTPA control is automatically performed based on the actual effective maximum DC bus voltage and the required current on the as-axis. As shown in FIG. 10, the voltage limiting acts as the output to the flux and current controllers.

The voltage limiting is performed according to the following formula:

$$(R_s i_{ds})^2 + (R_s i_{qs} + \omega\lambda)^2 \leq V_{s,max}^2 \quad (9)$$

Vsmax depends on the PWM and the instant maximum DC bus voltage Vdc. It can be known from the formula (9) that the voltage constraint operation is to constrain the stator flux.

$$\lambda_{lim} = \frac{\sqrt{V_{s,max}^2 - (R_s \cdot i_{sd})^2} - R_s \cdot |i_{qs}|}{|\omega|} \cong \frac{V_{s,max} - R_s \cdot |i_{qs}|}{|\omega|} \quad (10)$$

$$V_{s,max} = V_{dc}/\sqrt{3} \quad (13)$$

As shown in FIG. 10, FIG. 10 is a module diagram of the generation of the maximum current on the as-axis, where the limitation to the current and the load angle in the maximum torque per volt (MTPV) control of the torque rise control is illustrated. In order to transfer the required torque, the current on the qs-axis is calculated from a torque/current generation module in FIG. 10; however, the current on the as-axis is limited by the maximum current of the frequency converter. The positive and negative values of the current required by a current limiter for the qs-axis are bidirectional.

The current on the qs-axis is constrained by the maximum current of the frequency converter, and the maximum reference current on the qs-axis is defined as:

$$i_{qs,max} \leq \sqrt{I_{s,max}^2 - i_{ds}^2} \quad (11)$$

where ids is the stator current on the ds-axis. In the case of a high speed, during the torque rise control, the optimal control is to maximum the effectiveness of the available phase voltage so as to result in the minimum current. In order to carry out the control, the operation operates under the enabled or disenabled maximum load angle condition is closed, so it is called a maximum torque per volte (MTPV) operation. The maximum load angle may be obtained by a load angle analysis process, comprising simulating and accelerating the implementation of assessment tests. The maximum load angle is determined as load angle limiting, to ensure the stability of the motor. As shown in FIG. 10, the load angle limiting is performed by a PI controller in order to reduce the maximum allowable current.

Figure 11:
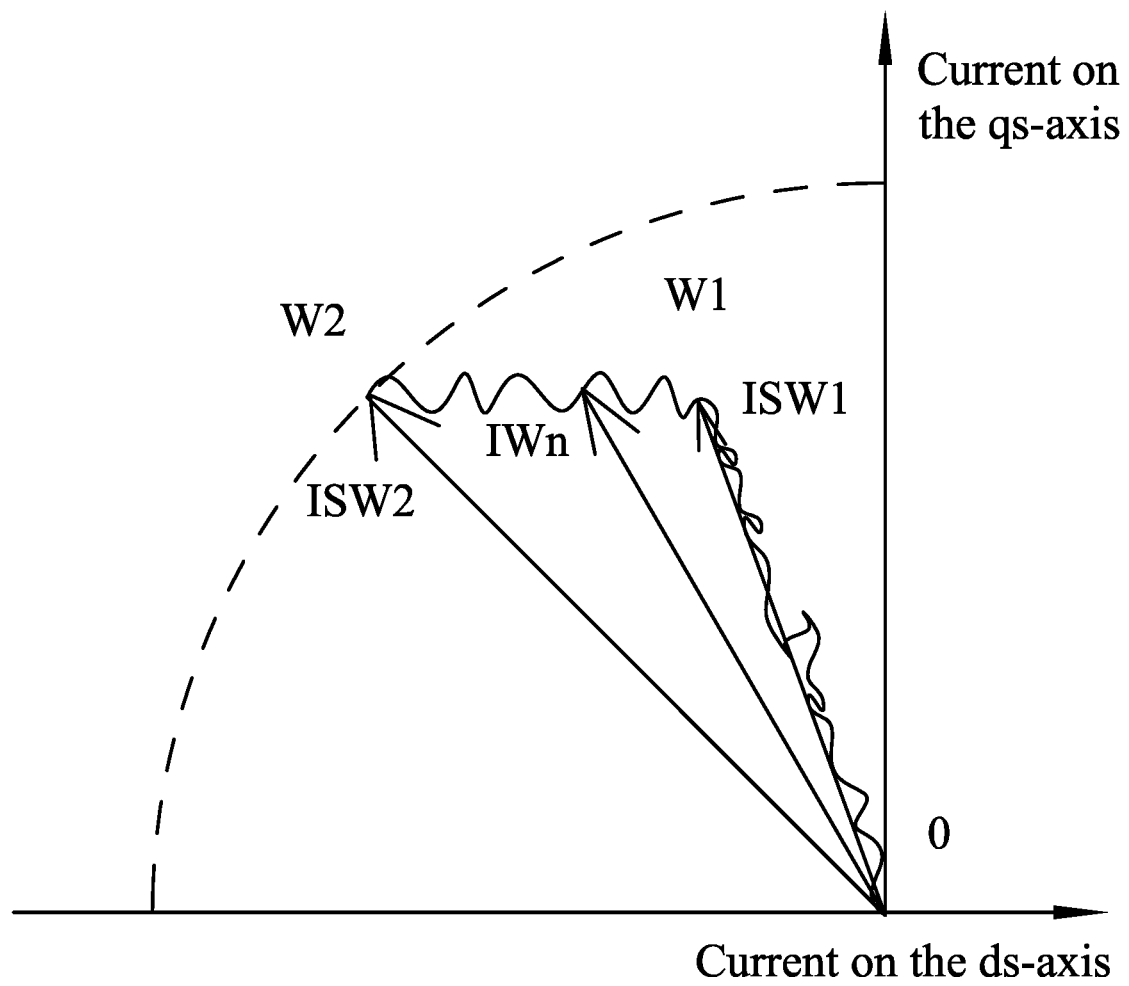
FIG. 11 is a reference diagram of vector control as described in the disclosure.

As shown in FIG. 11, within a low speed range, the motor control is operated in a MTPA operation mode, and marked with a curve section (0, W1) having a current vector ISW1. As the speed increases, the frequency converter gets saturated. A curve of the motor operating in the MTPV mode is a line section (W1, W2) having a current vector ISW2. Accordingly, the maximum torque and rotation speed are reached, the control is very efficient and the electric energy is saved. The current vector IWN is a current transition vector from the point W1 to the point W2. It can be known from this figure that the route is very short, so that it is efficient and the energy loss in the transition stage is saved.

Figure 12A:
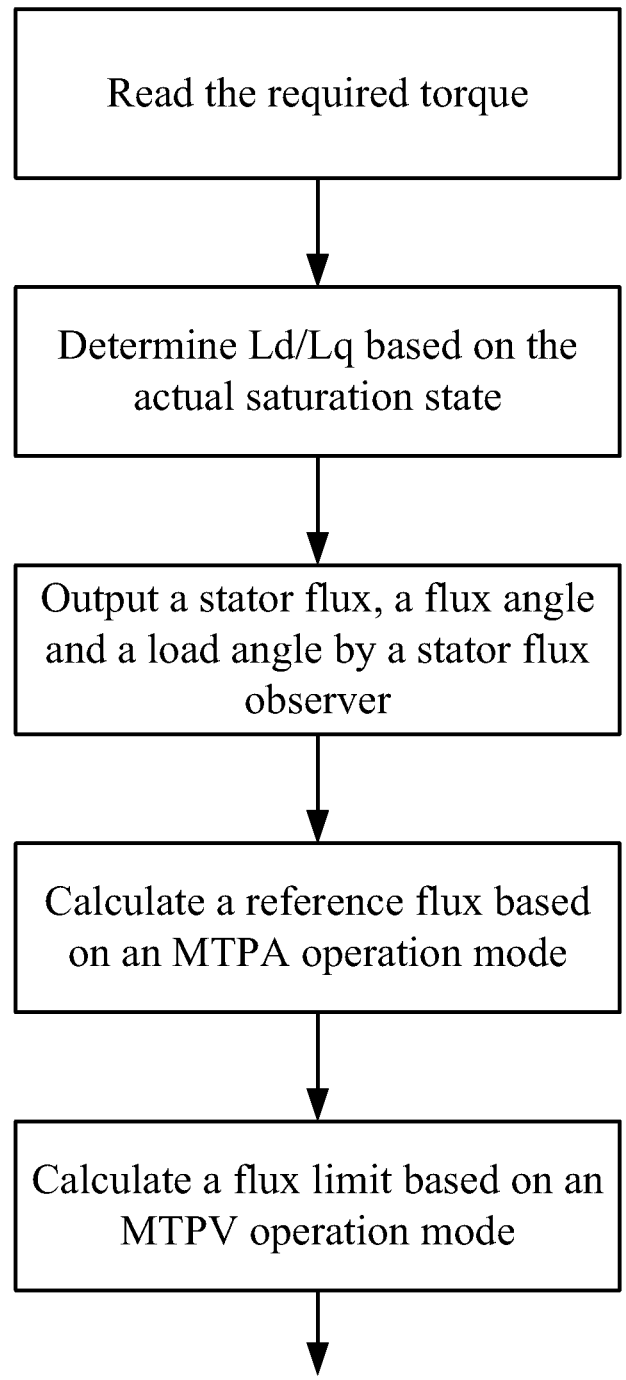
FIG. 12A is a control flowchart of part of software in a microprocessor as described in the disclosure.
Figure 12B:
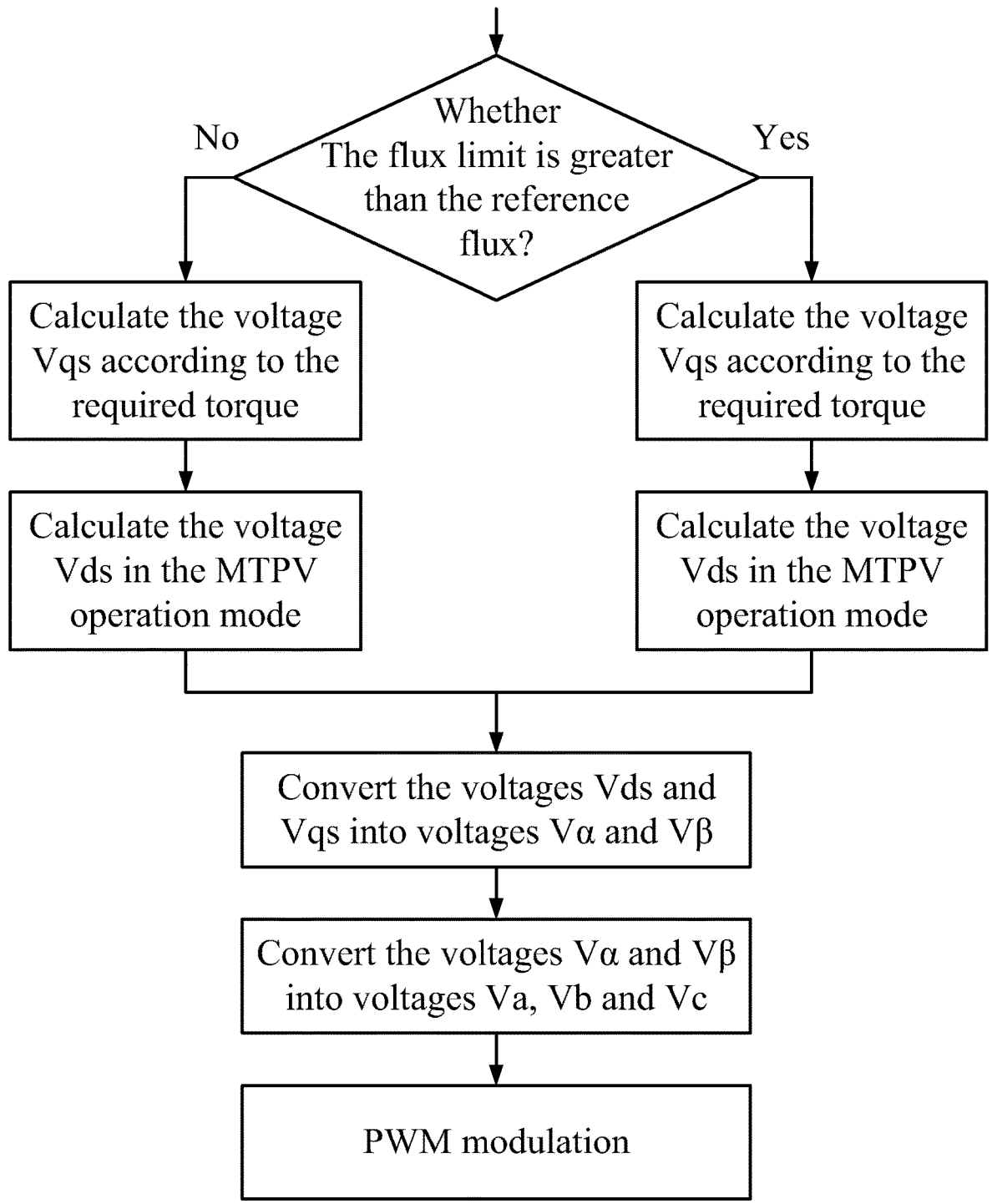
FIG. 12B is a control flowchart of another part of software in the microprocessor as described in the disclosure.

FIGS. 12A and 12B show a control method after a sensorless BLDC motor is successfully started. The BLDC motor comprises a stator assembly, a rotor assembly and a motor controller. The rotor assembly is a salient-pole inner rotor formed by embedding magnetic steel into a rotor core. The motor controller employs a sensorless vector control method. The motor controller comprises a microprocessor, a frequency converter and a detection unit. The detection unit inputs a phase current, a phase voltage and a DC bus voltage into the microprocessor, and the microprocessor outputs a signal for controlling the frequency converter. The frequency converter is connected to a winding of the stator assembly. A torque current control module, a direct stator flux vector control module (i.e., a flux voltage control module) and a stator flux observer are provided in the microprocessor. The control method is summarized as follows:

1) the required torque is read;
2) the stator flux observer outputs a stator flux, a flux angle and a load angle;
3) a reference flux is calculated based on a MTPA operation mode, where the MTPA operation mode is an operation mode for outputting the maximum torque per ampere;
4) a flux limit is calculated based on a MTPV operation mode, where the MTPV operation mode is an operation mode for outputting the maximum torque per volt;
5) it is determined whether the flux limit is greater than the reference flux;
6) if the flux limit is greater than the reference flux, the frequency converter is not saturated, a voltage Vqs is calculated according to the torque demand, and a voltage Vds is calculated in the MTPA operation mode; and, if the flux limit is not greater than the reference flux, the voltage Vqs is calculated according to the torque demand, and the voltage Vds is calculated in the MTPV operation mode; and
7) the voltage Vds and the voltage Vqs are converted into voltages Vα and Vβ under stationary coordinates, the voltages Vα and Vβ under stationary coordinates are then converted into three voltages Va, Vb and Vc, and PWM modulation is performed by the three voltages Va, Vb and Vc.

Figure 13:
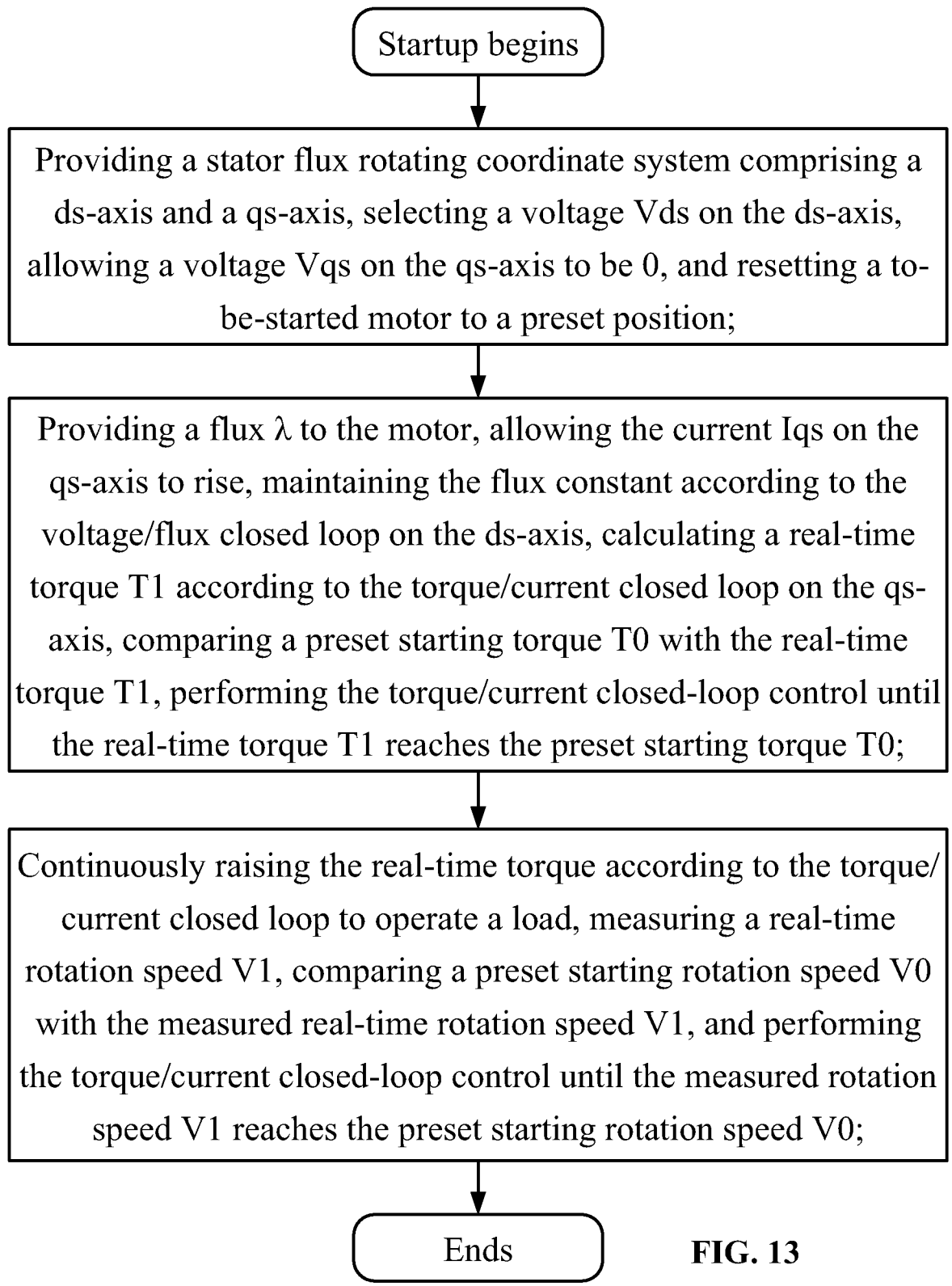
FIG. 13 is a flowchart of a method of starting a sensorless BLDC motor as described in the disclosure.

Based on the aforesaid descriptions, a method of starting a sensorless BLDC motor is described below. As shown in FIG. 13, the method comprises:

1) providing a stator flux rotating coordinate system comprising a ds-axis and a qs-axis, selecting a voltage Vds on the ds-axis, allowing a voltage Vqs on the qs-axis to be 0, and resetting a to-be-started motor to a preset position;

2) providing a flux λ to the motor, allowing the current Iqs on the qs-axis to rise, maintaining the flux constant according to the voltage/flux closed loop on the ds-axis, calculating a real-time torque T1 according to the torque/current closed loop on the qs-axis, comparing a preset starting torque T0 with the real-time torque T1, performing the torque/current closed-loop control until the real-time torque T1 reaches the preset starting torque T0; and 3) continuously raising the real-time torque according to the torque/current closed loop to operate a load, measuring a real-time rotation speed V1, comparing a preset starting rotation speed V0 with the measured real-time rotation speed V1, and performing the torque/current closed-loop control until the measured rotation speed V1 reaches the preset starting rotation speed V0.

In 2), the flux λ input to the motor ranges from 60% to 100% of the saturated flux. Particularly, the flux λ input to the motor is a saturated flux.

The starting torque T0 is a critical torque; when the real-time torque T1 is greater than the starting torque T0, the motor rotates.

The load driven by the motor is a fixed load, and the starting torque T0 is a preset value acquired by experimental measurement, and adapts to start the fixed load.

The load driven by the motor is a variable load, and the starting torque T0 is a preset value acquired by experimental measurement, and adapts to start the minimum load.

In 3), the motor is controlled by a closed-loop proportion-integration-differentiation (PID) controller, and the torque is raised by ΔT at intervals until the rotation speed meets the requirements. Specifically, ΔT can be 5-10% of the starting torque T0.

The principle of the method of starting a sensorless BLDC motor is based on two loop PID controls in FIG. 7. The first PID control is a moment-current loop control PID (a torque controller), and the second PID control is a voltage-flux loop control PID (a flux controller). Meanwhile, the following formulae are employed:

$$\bar{v}_{dqs} = R_s \cdot \bar{i}_{dqs} + \frac{d}{dt}\begin{bmatrix}\lambda \\ 0\end{bmatrix} + \lambda \cdot \begin{bmatrix}0 \\ \omega + \frac{d\delta}{dt}\end{bmatrix} \quad (6)$$

$$T_e = (3/2) \cdot p \cdot \lambda \cdot i_{qs} = k_T \cdot i_{qs} \quad (7)$$

$$\frac{d\lambda}{dt} = -R_s \cdot i_{ds} + v_{ds} \quad (8)$$

$$Vqs = Iqs^* Rs + Ls^* \, dIqs/dt \quad (12)$$

There is no need to input an external torque in the starting stage. If the load driven by the motor is a fixed load, the starting torque T0 is a preset value acquired by experimental measurement, and adapts to start the fixed load. The starting torque T0 is regarded as an external input torque capable of starting the load. The flux λ input to the motor is a saturated flux value (which remains unchanged in the starting stage, so that the torque may be raised at the fastest speed). The current Iqs on the qs-axis is allowed to increase according to the formula (7) so as to gradually raise the torque, and closed loop control is performed by the torque-current loop control PID (the torque controller). The second PID control is to perform closed loop controller by a voltage-flux loop control PID (a flux controller). Accordingly, the flux becomes a saturated flux. The raising stage of the torque in the locked state in 2) is realized by the above principle. Since the starting torque T0 is a critical torque, in 3) (the starting and operating stage), based on the starting torque T0, the torque is continuously increased by the torque/current closed loop so as to rotate a load; a preset starting rotation speed V0 is compared with a measured rotation speed V1 and closed-loop control is then performed until the measured rotation speed V1 reaches the preset starting rotation speed V0, so that the normal startup is completed; and, if the measured rotation speed V1 is less than the preset starting rotation speed V0, it considered that the startup is failed.

In the method of starting the sensorless BLDC motor, the flux $\lambda$ input to the motor is not necessarily a saturated flux value, and may be a 60% saturated flux value or an 80% saturated flux value as long as the flux $\lambda$ is a constant value. By the second PID control, the closed loop control is performed by voltage-flux loop control PID (a flux controller), so that the flux remains unchanged. Then, the torque valve may be quantitatively calculated by the formula (7), so that the closed loop control is realized by the torque-current loop control PID (the torque controller).

When the load driven by the motor is a variable load, for example, a washing machine, although the load is variable, the variable load has a range, i.e., a range from the maximum load to the maximum load. In this case, the starting torque T0 is a preset value acquired by experimental measurement, and adapts to start the minimum load. After 2) is completed, the process proceeds to 3) (the starting and operating stage): based on the starting torque T0, the torque is continuously increased by the torque/current closed loop so as to rotate a load; a preset starting rotation speed V0 is compared with a measured rotation speed V1 and closed-loop control is then performed until the measured rotation speed V1 reaches the preset starting rotation speed V0, so that the startup is completed; and, if the measured rotation speed V1 is less than the preset starting rotation speed V0, it means that the startup fails. The motor is controlled by a closed-loop proportion-integration-differentiation (PID) controller, and the torque is raised by $\Delta T$ at intervals until the measured rotation speed V1 reaches the preset starting rotation speed V0. The $\Delta T$ may be within a range from 5%T0 to 10%T0. By introducing a speed closed loop control link in 3), the startup of the variable load may be better adapted.

Figure 14:
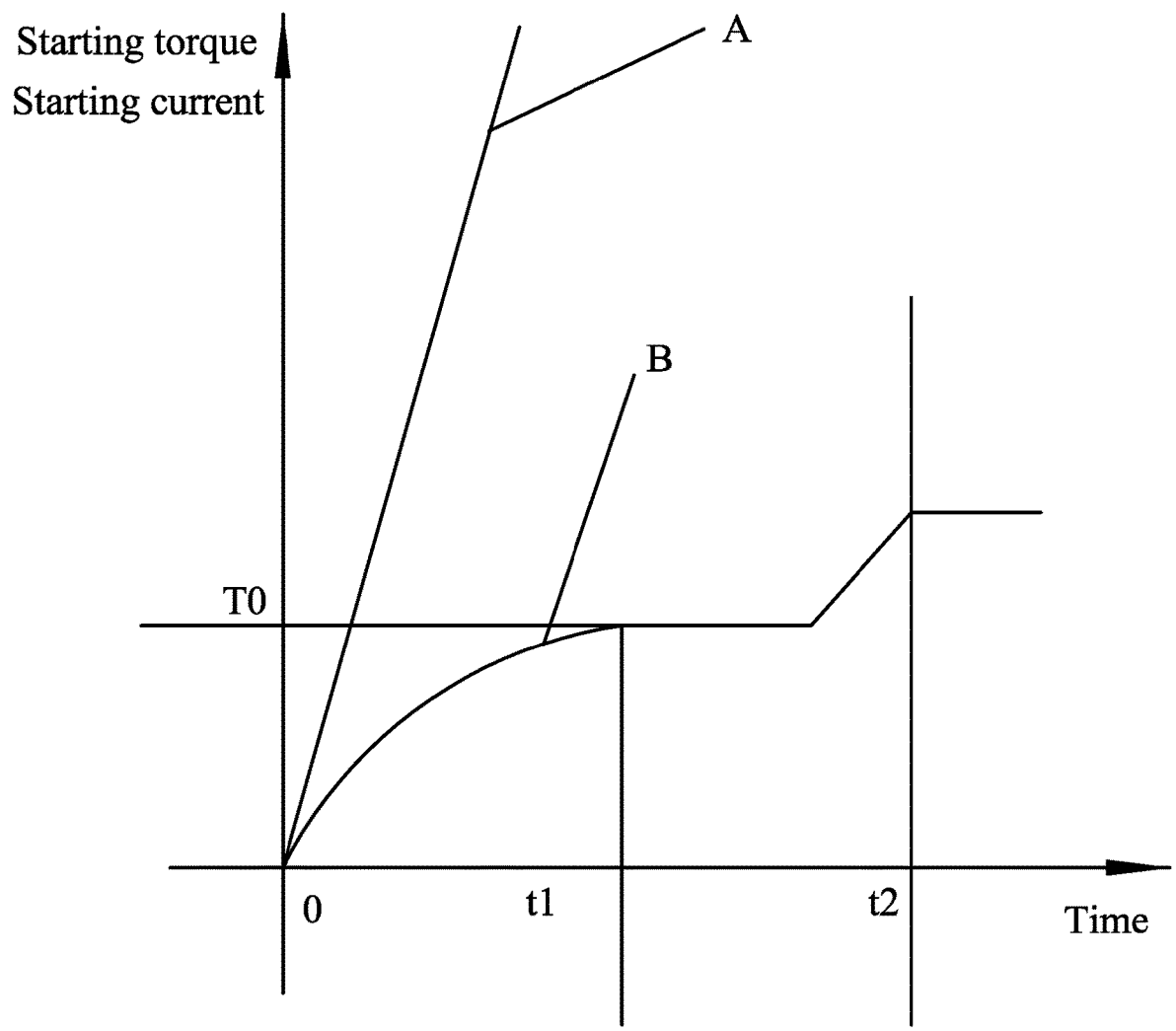
FIG. 14 is a comparison diagram of a starting line as described in the disclosure and a conventional starting line.

FIG. 14 shows a comparison diagram of a starting line of the method of starting a sensorless BLDC motor as described in the disclosure and a starting line of a conventional starting method, where the line A represents the starting line of the conventional method of starting a sensorless BLDC motor and the line B represents the starting line of the method of starting a sensorless BLDC motor as described in the disclosure. Apparently, at the beginning of the starting line of the conventional method, large current and torque are provided, and the actual load demand is not estimated; however, at the beginning of the starting line of the method as described in the disclosure, the actual load demand is considered, so the startup is mild, the range of application is wide, the closed loop control is used during the whole process, and the startup is smooth, balanced and stable, so that the impact on the current power components and the noise resulted from the large impact current in the starting stage of the motor are avoided. As a result, the starting current is low, the impact on current power components is small, and the generated noise is low. Accordingly, the normal operation of the motor is ensured, and the service life of the product is prolonged.

It will be obvious to those skilled in the art that changes and modifications may be made, and therefore, the aim in the appended claims is to cover all such changes and modifications.

What is claimed is:

1. A method, comprising:
   1) providing a stator flux rotating coordinate system comprising a ds-axis and a qs-axis, selecting a voltage Vds on the ds-axis, allowing a voltage Vqs on the qs-axis to be 0, and resetting a to-be-started motor to a preset position;
   2) providing a flux $\lambda$ to the motor, allowing the current Iqs on the qs-axis to rise, maintaining the flux constant according to the voltage/flux closed loop on the ds-axis, calculating a real-time torque T1 according to the torque/current closed loop on the qs-axis, comparing a preset starting torque T0 with the real-time torque T1, performing the torque/current closed-loop control until the real-time torque T1 reaches the preset starting torque T0; and
   3) continuously raising the real-time torque according to the torque/current closed loop to operate a load, measuring a real-time rotation speed V1, comparing a preset starting rotation speed V0 with the measured real-time rotation speed V1, and performing the torque/current closed-loop control until the measured rotation speed V1 reaches the preset starting rotation speed V0.

2. The method of claim 1, wherein in 2), the flux $\lambda$ input to the motor ranges from 60% to 100% of a saturated flux.

3. The method of claim 2, wherein in 2), the flux $\lambda$ input to the motor is a saturated flux.

4. The method of claim 3, wherein the starting torque T0 is a critical torque; when the real-time torque T1 is greater than the starting torque T0, the motor rotates.

5. The method of claim 4, wherein the load driven by the motor is a fixed load, and the starting torque T0 is a preset value acquired by experimental measurement, and adapts to start the fixed load.

6. The method of claim 4, wherein the load driven by the motor is a variable load, and the starting torque T0 is a preset value acquired by experimental measurement, and adapts to start a minimum load of the variable load.

7. The method of claim 2, wherein in 3), the motor is controlled by a closed-loop proportion-integration-differentiation (PID) controller, and the torque is raised by $\Delta T$ at intervals until the measured rotation speed V1 reaches the preset starting rotation speed V0.

8. The method of claim 7, wherein the torque $\Delta T$ is 5-10% of the starting torque T0.

* * * * *